US012773879B2

(12) United States Patent
Uemura

(10) Patent No.: US 12,773,879 B2
(45) Date of Patent: Oct. 27, 2026

(54) PNEUMATIC TIRE

(71) Applicant: The Yokohama Rubber Co., LTD., Tokyo (JP)

(72) Inventor: Takanori Uemura, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 455 days.

(21) Appl. No.: 17/283,985

(22) PCT Filed: Oct. 25, 2019

(86) PCT No.: PCT/JP2019/041869

§ 371 (c)(1),
(2) Date: Apr. 9, 2021

(87) PCT Pub. No.: WO2020/090644

PCT Pub. Date: May 7, 2020

(65) Prior Publication Data

US 2021/0347212 A1 Nov. 11, 2021

(30) Foreign Application Priority Data

Nov. 1, 2018 (JP) ................................ 2018-206756

(51) Int. Cl.
*B60C 11/12* (2006.01)
*B60C 11/13* (2006.01)

(52) U.S. Cl.
CPC ...... *B60C 11/1392* (2013.01); *B60C 11/1281* (2013.01)

(58) Field of Classification Search
CPC .. B60C 11/1376; B60C 11/12; B60C 11/1281
See application file for complete search history.

(56) References Cited

U.S. PATENT DOCUMENTS

2013/0206298 A1* 8/2013 Guillermou ............. B60C 11/13 152/209.18
2016/0280012 A1* 9/2016 Uchida ............... B60C 11/1376
(Continued)

FOREIGN PATENT DOCUMENTS

CN 104 275 989 A 1/2015
EP 3 159 186 A1 4/2017
(Continued)

OTHER PUBLICATIONS

JP 2004-217058 Machine Translation; Ohshi, Toshiyuki (Year: 2004).*
JP 2018-122772 Machine Translation; Koda, Hiraku (Year: 2018).*

*Primary Examiner* — Justin R Fischer
*Assistant Examiner* — Nicholas J Weiler
(74) *Attorney, Agent, or Firm* — Thorpe North & Western

(57) ABSTRACT

Provided is a pneumatic tire capable of providing improved steering stability performance on dry road surfaces and improved steering stability performance on wet road surfaces in a compatible manner. A sipe (12) includes at least one end communicating with a main groove (9) and a chamfered portion (13) in at least one edge, and the chamfered portion (13) includes at least one end open to the main groove (9). In a meridian cross-sectional view, a profile line (L1) projects further to an outer side in a tire radial direction than a reference tread profile line (L0). A radius of curvature (TR) (mm) of the reference tread profile line (L0) and a radius of curvature (RR) (mm) of the profile line (L1) of a rib (10) satisfy a relationship of TR>RR. The chamfered portion (13) is disposed straddling a maximum projection position (P) of the profile line (L1) of the rib (10). A maximum projection amount (D) (mm) of the rib (10) with respect to the reference tread profile line (L0) and a maxi- (Continued)

mum width (W) (mm) of the chamfered portion (13) satisfy a relationship of 0.05 $mm^2$<W×D<1.50 $mm^2$.

14 Claims, 4 Drawing Sheets

(56) References Cited

U.S. PATENT DOCUMENTS

| | | | | |
|---|---|---|---|---|
| 2017/0190222 | A1* | 7/2017 | Suzuki | B60C 11/13 |
| 2019/0193476 | A1* | 6/2019 | Shinzawa | B60C 5/00 |
| 2019/0232725 | A1* | 8/2019 | Sakamoto | B60C 11/04 |

FOREIGN PATENT DOCUMENTS

| | | | | | |
|---|---|---|---|---|---|
| EP | 3178668 | A1 | | 6/2017 | |
| JP | 2004217058 | A | * | 8/2004 | B60C 11/11 |
| JP | 2013-537134 | A | | 9/2013 | |
| JP | 5447748 | B1 | | 3/2014 | |
| JP | 2015-147545 | A | | 8/2015 | |
| JP | 2017-13693 | A | | 1/2017 | |
| JP | 2017-87858 | A | | 5/2017 | |
| JP | 2018-43637 | A | | 3/2018 | |
| JP | 2018039415 | A | * | 3/2018 | B60C 11/03 |
| JP | 2018-111450 | A | | 7/2018 | |
| JP | 2018122772 | A | * | 8/2018 | B60C 11/1204 |
| WO | WO 2018-142802 | A1 | | 8/2018 | |

* cited by examiner

PNEUMATIC TIRE

TECHNICAL FIELD

The present technology relates to a pneumatic tire and particularly relates to a pneumatic tire that can provide improved steering stability performance on dry road surfaces and improved steering stability performance on wet road surfaces in a compatible manner by devising a sipe chamfer shape.

BACKGROUND ART

In the related art, in a tread pattern of a pneumatic tire, a plurality of sipes are formed in a rib defined by a plurality of main grooves. By providing such sipes, drainage properties are ensured, and steering stability performance on wet road surfaces is exhibited. However, when a large number of sipes are disposed in a tread portion in order to improve the steering stability performance on wet road surfaces, the rigidity of the ribs decreases, which has the disadvantage that steering stability performance on dry road surfaces deteriorates.

Various pneumatic tires have been proposed in which sipes are formed in a tread pattern and chamfered (for example, see Japan Unexamined Patent Publication No. 2013-537134). If the sipes are formed and chamfered, edge effects may be lost depending on the shape of the chamfers, and depending on the dimensions of the chamfers, improvement in steering stability performance on dry road surfaces and improvement in steering stability performance on wet road surfaces may be insufficient.

SUMMARY

The present technology provides a pneumatic tire that can provide improved steering stability performance on dry road surfaces and improved steering stability performance on wet road surfaces in a compatible manner by devising a sipe chamfer shape.

A pneumatic tire according to an embodiment of the present technology includes: in a tread portion, a plurality of main grooves extending in a tire circumferential direction, a plurality of rows of ribs defined by the plurality of main grooves, and a sipe extending in a tire width direction, the sipe including: at least one end communicating with the main groove and a chamfered portion in at least one edge, the chamfered portion including at least one end open to the main groove, a profile line defining a road contact surface of the rib including the sipe projecting further to an outer side in a tire radial direction than a reference tread profile line in a meridian cross-sectional view, a radius of curvature TR (mm) of an arc forming the reference tread profile line and a radius of curvature RR (mm) of an arc forming the profile line of the rib satisfying a relationship of TR>RR, the chamfered portion being disposed straddling a maximum projection position of the profile line of the rib, and a maximum projection amount D (mm) of the rib with respect to the reference tread profile line and a maximum width W (mm) of the chamfered portion satisfying a relationship of $0.05\ mm^2<W\times D<1.50\ mm^2$.

In the present technology, since the sipe includes at least one end communicating with the main groove and a chamfered portion in at least one edge, drainage properties when contacting the ground are improved, and steering stability performance on wet road surfaces can be improved. In addition, at least one end of the chamfered portion is open to the main groove, the profile line defining the road contact surface of the rib including the sipe projects further to the outer side in the tire radial direction than the reference tread profile line in a meridian cross-sectional view, the radius of curvature TR of the arc forming the reference tread profile line and the radius of curvature RR of the arc forming the profile line of the rib satisfy the relationship of TR>RR, and the chamfered portion is disposed straddling the maximum projection position of the profile line of the rib. Therefore, in the rib including the sipe, drainage in the rib is promoted due to a shape projecting to outer side in the tire radial direction, which leads to further improvement in steering stability performance on wet road surfaces. Furthermore, since the maximum projection amount D of the rib with respect to the reference tread profile line and the maximum width W of the chamfered portion satisfy the relationship of $0.05\ mm^2<W\times D<1.50\ mm^2$, it is possible to improve the steering stability performance on dry road surfaces and the steering stability performance on wet road surfaces in a well-balanced manner.

In the present technology, preferably, the chamfered portion is disposed in only one edge of the sipe. Due to this, the drainage properties can be improved by the chamfered portion on a side where the chamfered portion of the sipe is present, and the water film can be removed by the edge effect on a side where the chamfered portion of the sipe is not present. As a result, both steering stability performance on dry road surfaces and steering stability performance on wet road surfaces can be achieved in a compatible manner.

In the present technology, preferably, the sipe is inclined with respect to the tire circumferential direction. Due to this, the edge effect can be improved, and the steering stability performance on wet road surfaces can be improved effectively.

In the present technology, preferably, an inclination angle θ on an acute angle side of the sipe with respect to the tire circumferential direction is from 40° to 80°. Due to this, it is possible to improve steering stability performance on dry road surfaces effectively.

In the present technology, preferably, only one end of the sipe terminates in the rib. Due to this, the rigidity of the rib can be improved, and the steering stability performance on dry road surfaces can be improved effectively.

In the present technology, preferably, the sipe is disposed in the plurality of rows of ribs. Due to this, the steering stability performance on dry road surfaces and the steering stability performance on wet road surfaces can be improved in a compatible manner.

In the present technology, preferably, at least a portion of the sipe is curved or bent in a plan view. Due to this, the total amount of the edges in each sipe is increased, and the steering stability performance on wet road surfaces can be improved effectively.

In the present technology, preferably, both ends of the chamfered portion are open to the main groove. Due to this, the steering stability performance on wet road surfaces can be improved effectively.

BRIEF DESCRIPTION OF DRAWINGS

FIGS. 4A to 4D illustrate cross-sectional shapes of sipes formed in the tread portion of the pneumatic tire according to the embodiment of the present technology, in which FIG. 4A is a cross-sectional view taken along a line X-X in FIG. 2 and FIGS. 4B to 4D are cross-sectional views of each modified example.

DETAILED DESCRIPTION

Figure 1:
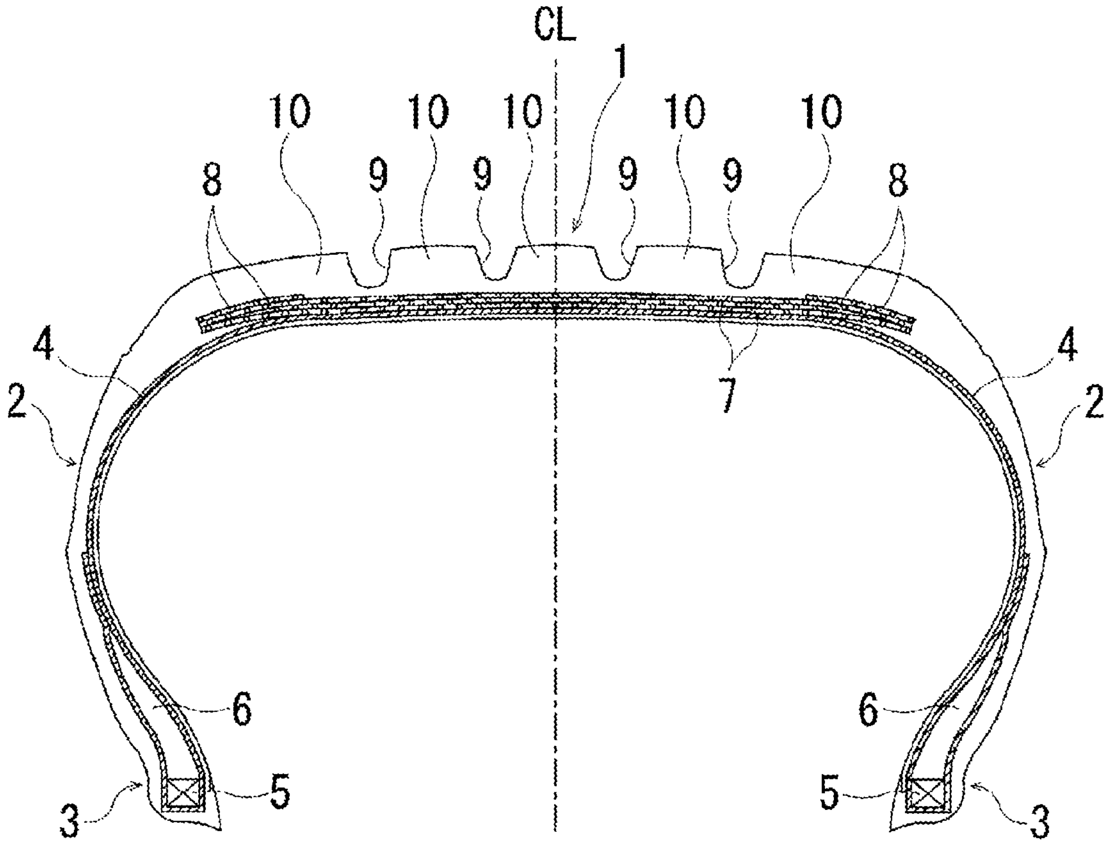
FIG. 1 is a meridian cross-sectional view illustrating a pneumatic tire according to an embodiment of the present technology.

Configurations of embodiments of the present technology will be described in detail below with reference to the accompanying drawings. FIG. 1 illustrates a pneumatic tire according to an embodiment of the present technology. In FIG. 1, CL denotes a tire center line.

As illustrated in FIG. 1, a pneumatic tire according to an embodiment of the present technology includes an annular tread portion 1 extending in a tire circumferential direction, a pair of sidewall portions 2, 2 disposed on both sides of the tread portion 1, and a pair of bead portions 3, 3 disposed on an inner side of the sidewall portions 2 in a tire radial direction.

A carcass layer 4 is mounted between the pair of bead portions 3, 3. The carcass layer 4 includes a plurality of reinforcing cords extending in the tire radial direction and is folded back around bead core 5 disposed in each of the bead portions 3 from a tire inner side to a tire outer side. A bead filler 6 having a triangular cross-sectional shape and formed of a rubber composition is disposed on an outer circumference of the bead core 5.

A plurality of belt layers 7 are embedded on an outer circumferential side of the carcass layer 4 in the tread portion 1. Each of the belt layers 7 includes a plurality of reinforcing cords that are inclined with respect to the tire circumferential direction, and the reinforcing cords are disposed and intersect each other between the layers. In the belt layers 7, the inclination angle of the reinforcing cords with respect to the tire circumferential direction is set to fall within a range of from 10° to 40°, for example. Steel cords are preferably used as the reinforcing cords of the belt layers 7. To improve high-speed durability, at least one belt cover layer 8, formed by disposing reinforcing cords at an angle of, for example, not greater than 5° with respect to the tire circumferential direction, is disposed on an outer circumferential side of the belt layers 7. Organic fiber cords such as nylon and aramid are preferably used as the reinforcing cords of the belt cover layer 8.

A plurality of main grooves 9 extending in the tire circumferential direction are formed in the tread portion 1. A plurality of ribs 10 are defined in the tread portion 1 by these main grooves 9. Note that in the present technology, the main groove 9 refers to a groove including a wear indicator.

Note that the tire internal structure described above represents a typical example for a pneumatic tire, and the pneumatic tire is not limited thereto.

Figure 2:
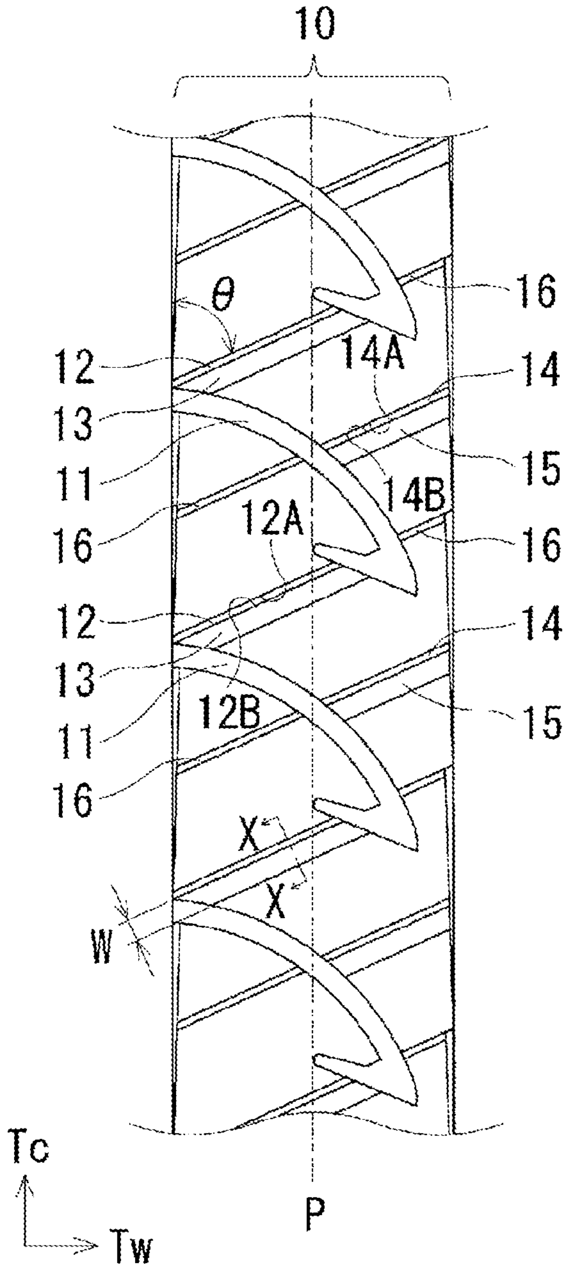
FIG. 2 is a plan view illustrating a portion of a tread portion of the pneumatic tire according to the embodiment of the present technology.

FIG. 2 illustrates a portion of a tread portion of a pneumatic tire according to an embodiment of the present technology. In FIG. 2, Tc denotes the tire circumferential direction, Tw denotes a tire width direction, and P denotes a maximum projection position of the rib 10 with respect to a reference tread profile line L0 which will be described later.

As illustrated in FIG. 2, a plurality of lug grooves 11 extending in the tire circumferential direction and a plurality of sipes 12, 14, and 16 extending in the tire width direction are formed in the rib 10. Additionally, an edge of the rib 10 is chamfered along the main groove 9.

The lug grooves 11 are inclined with respect to the tire width direction and include a bent portion with an acute angle. The lug groove 11 includes one end open to the main groove 9 and the other end terminating in the rib 10. Such lug grooves 11 are formed in the rib 10 at intervals in the tire circumferential direction. In order to the improve steering stability performance on wet road surfaces, the lug grooves 11 preferably have a maximum width from 2 mm to 7 mm and more preferably from 3 mm to 6 mm, and preferably have a maximum depth of 3 mm to 8 mm and more preferably from 4 mm to 7 mm.

Each of the sipes 12, 14, and 16 is linear and includes one end terminating in the rib 10 and the other end communicating with the main groove 9 adjacent to the rib 10. The sipes 12 and 14 which communicate with each of the main grooves 9 located on both sides of the rib 10 are alternately disposed in the tire circumferential direction, and the sipes 12 and 14 are disposed in a staggered manner in the tire circumferential direction as a whole. Additionally, the sipes 16 are disposed in like manner, and the sipes 16 are disposed in a staggered manner in the tire circumferential direction as a whole. According to an embodiment of the present technology, the sipes 12, 14, and 16 are narrow grooves having a groove width of 1.5 mm or less.

The sipes 12 and 14 each include edges 12A and 12B and edges 14A and 14B that face each other, respectively. A chamfered portion 13 is formed in at least one of the edges 12A and 12B, and a chamfered portion 15 is formed in at least one of the edges 14A and 14B. In the embodiment of FIG. 2, the chamfered portions 13 and 15 are formed in one set of edges 12B and 14B of the sipes 12 and 14, and a non-chamfered region in which another chamfered portion is not present is provided at portions of the sipes 12 and 14 that face the chamfered portions 13 and 15. Moreover, the sipe 16 is not chamfered.

Although one end in the tire width direction of the chamfered portion 13 of the sipe 12 terminates at a central portion in the tire width direction of the rib 10, the one end is connected to the lug groove 11 and is open to the main groove 9 via the lug groove 11, and the other end is connected to an opening end, to the main groove 9, of another lug groove 11 and is open to the main groove 9 via the other lug groove 11. In other words, both ends of the chamfered portion 13 are substantially open to the main groove 9. Moreover, although one end of the chamfered portion 15 of the sipe 14 terminates at the central portion in the tire width direction of the rib 10, the one end is connected to the lug groove 11 and is open to the main groove 9 via the lug groove 11, and the other end is open to the main groove 9.

Figure 3:
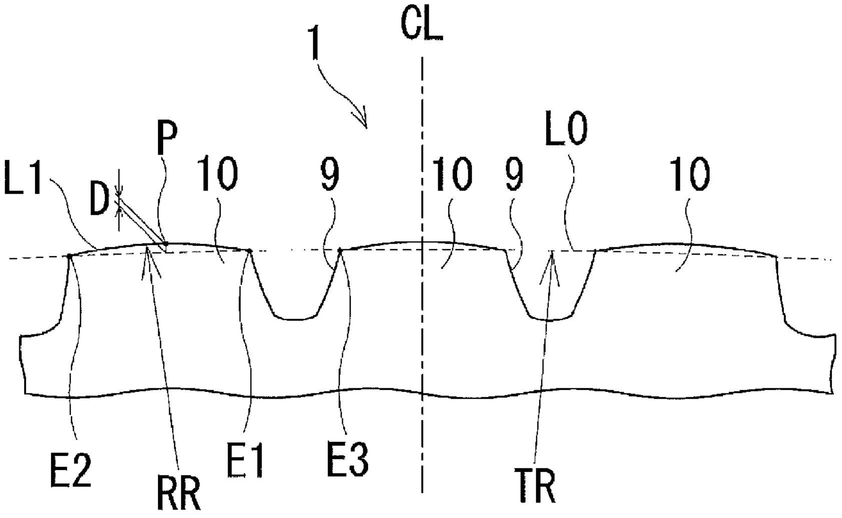
FIG. 3 is a meridian cross-sectional view illustrating a contour shape of the tread portion of the pneumatic tire according to the embodiment of the present technology.

FIG. 3 illustrates a contour shape of the tread portion 1 of the pneumatic tire according to the embodiment of the present technology. In FIG. 3, in a meridian cross-sectional view, when the reference tread profile line L0 is assumed, the reference tread profile line L0 formed from an arc (radius of curvature: TR) passing through three points (endpoints E1 to E3) including: both endpoints E1 and E2 in the tire width direction of the rib 10 including the sipe 12 and an endpoint E3 in the tire width direction of the main groove 9 located close to the tire center line CL among the main grooves 9 adjacent to the rib 10, a profile line L1 formed from an arc (radius of curvature: RR) that defines a road contact surface of the rib 10 projects further to an outer side in the tire radial direction than the reference tread profile line L0. The arc forming the reference tread profile line L0 and the arc forming the profile line L1 are arcs having the center on an inner side in the tire radial direction. The radius of curvature TR of the arc forming the reference tread profile line L0 of the tread portion 1 and the radius of curvature RR of the arc forming the profile line L1 of the rib 10 satisfy a relationship of TR>RR.

Note that FIG. 3 illustrates the contour shape of the tread portion 1 in an exaggerated manner in order to facilitate understanding of the characteristics of the tread portion 1, and the contour shape thereof does not necessarily match an actual contour shape. Additionally, when the edges of the rib 10 of the tread portion 1 are chamfered, the endpoints E1 and E2 of the rib 10 are identified by the intersection points of an extension line of the groove wall surface of the main groove 9 in the tire meridian cross-section and an extension line of the road contact surface of the rib 10. When the reference tread profile line L0 is assumed in the rib 10 located on the tire center line CL, three points are used as a reference, the three points including: both endpoints in the tire width direction of the rib 10 and an endpoint of one of the main grooves 9 located on both sides of the rib 10 on an inner side in the tire width direction of the rib 10. When the reference tread profile line L0 is assumed in the rib 10 located on the outermost side (the shoulder portion) in the tire width direction, three points are used as a reference, the three points including: an endpoint on the inner side in the tire width direction of the rib 10 and both endpoints in the tire width direction of another rib 10 located on the inner side in the tire width direction of the rib 10.

In the pneumatic tire described above, a position in the tire width direction where the projection amount of the profile line L1 of the ribs 10 with respect to the reference tread profile line L0 is greatest is a maximum projection position P. The chamfered portion 13 of the sipe 12 is disposed straddling the maximum projection position P of the profile line L1 of the rib 10. In other words, the chamfered portion 13 is present on both sides in the tire width direction with respect to the maximum projection position P. On the other hand, the chamfered portion 15 of the sipe 14 terminates in the rib 10 without reaching the maximum projection position P.

The maximum value of the projection amount of the profile line L1 with respect to the reference tread profile line L0 is a maximum projection amount D (mm), and the maximum value of the width of the chamfered portion 13 measured along the direction orthogonal to the sipe 12 is a maximum width W (mm). At this time, the maximum projection amount D of the rib 10 with respect to the reference tread profile line L0 and the maximum width W of the chamfered portion 13 satisfy a relationship of $0.05\ mm^2<W\times D<1.50\ mm^2$. In particular, a relationship of $0.10\ mm^2<W\times D<1.00\ mm^2$ is preferably satisfied. Additionally, the maximum projection amount D of the rib 10 with respect to the reference tread profile line L0 is preferably in a range of from 0.1 mm to 0.8 mm, and the maximum width W of the chamfered portion 13 is preferably in a range of from 0.5 mm to 4.0 mm.

In the pneumatic tire described above, since at least one end of the sipe 12 communicates with the main groove 9, and the chamfered portion 13 is provided in at least one of the edges 12A and 12B, drainage properties when contacting the ground are improved, and the steering stability performance on wet road surfaces can be improved. In addition, at least one end of the chamfered portion 13 is open to the main groove 9, the profile line L1 defining the road contact surface of the rib 10 including the sipe 12 projects further to the outer side in the tire radial direction than the reference tread profile line L0 in a meridian cross-sectional view, the radius of curvature TR of the arc forming the reference tread profile line L0 and the radius of curvature RR of the arc forming the profile line L1 of the rib 10 satisfy the relationship of TR>RR, and the chamfered portion 13 is disposed straddling the maximum projection position P of the profile line L1 of the rib 10. Therefore, in the rib 10 including the sipe 12, drainage in the rib 10 is promoted due to a shape projecting to the outer side in the tire radial direction, which leads to further improvement in steering stability performance on wet road surfaces. Furthermore, since the maximum projection amount D of the rib 10 with respect to the reference tread profile line L0 and the maximum width W of the chamfered portion 13 satisfy the relationship of $0.05\ mm^2<W\times D<1.50\ mm^2$, it is possible to improve the steering stability performance on dry road surfaces and the steering stability performance on wet road surfaces in a well-balanced manner. Here, if the product of the maximum projection amount D and the maximum width W is not greater than $0.05\ mm^2$, the steering stability performance on wet road surfaces tends to degrade. If the product of the maximum projection amount D and the maximum width W is not less than $1.50\ mm^2$, the steering stability performance on dry road surfaces tends to degrade.

Additionally, in the case of the embodiment illustrated in FIG. 2, since one set of ends of the sipes 12, 14, and 16 communicate with the lug groove 11, the sipes 12 and 14 and the sipe 16 are connected via the lug groove 11. Since the sipes substantially have a structure that the sipes pass through the rib 10, the drainage properties are improved, and the steering stability performance on wet road surfaces can be improved. Furthermore, the sipe 16 is disposed on an extension line of the sipes 12 and 14, which leads to improvement in drainage properties and contributes to further improvement in steering stability on wet road surfaces.

In FIG. 2, the chamfered portion 13 is disposed in only one edge 12B of the sipe 12, but there is no particular limitation thereto, and the chamfered portion 13 may be disposed in both edges 12A and 12B. When the chamfered portion 13 is disposed in only one of the edges 12A and 12B, the drainage properties can be improved by the chamfered portion 13 on a side where the chamfered portion 13 of the sipe 12 is present, and the water film can be removed by the edge effect of the edges 12B and 12A on a side where the chamfered portion 13 of the sipe 12 is not present. As a result, as compared to a case where the chamfered portion 13 is disposed in both edges 12A and 12B, both steering stability performance on dry road surfaces and steering stability performance on wet road surfaces can be achieved in a compatible manner.

Additionally, the sipe 12 is inclined with respect to the tire circumferential direction. Since the sipe 12 is inclined with respect to the tire circumferential direction, the edge effect can be improved, and the steering stability performance on dry road surfaces can be improved effectively. Note that an inclination angle θ is an inclination angle on an acute angle side of the sipe 12 with respect to the tire circumferential direction. In this case, the inclination angle θ of the sipe 12 is preferably from 40° to 80° and more preferably from 50° to 70°. By appropriately setting the inclination angle θ of the sipe 12 in this manner, it is possible to improve the steering stability performance on dry road surfaces more effectively. Here, if the inclination angle θ is smaller than 40°, uneven wear resistance performance degrades. If the inclination angle θ exceeds 80°, the effect of improving the steering stability performance on wet road surfaces is not sufficiently obtained. Note that, when a so-called pitch variation is employed in the groove pattern of the tread portion 1, the plurality of sipes 12 are provided at non-uniform intervals in the tire circumferential direction, and when the shapes and dimensions of the sipes 12 are different from each other, the inclination angle θ of the sipe 12 is the inclination angle of the sipe 12 at an intermediate pitch (for example, a pitch excluding the maximum pitch and the minimum pitch in the case of three types of pitch variations) in the rib 10.

Furthermore, although only one end in the tire width direction of the sipe 12 communicates with the main groove 9, there is no particular limitation thereto, and both ends of the sipe 12 may communicate with the main groove 9. If only one end of the sipe 12 terminates in the rib 10, since the rigidity of the rib 10 can be improved as compared to a case where both ends of the sipe 12 communicate with the main groove 9, it is possible to improve the steering stability performance on dry road surfaces effectively.

Moreover, although both ends in the tire width direction of the chamfered portion 13 are substantially open to the main groove 9, there is no particular limitation thereto, and only one end of the chamfered portion 13 may be open to the main groove 9. When both ends of the chamfered portion 13 are open to the main groove 9, the steering stability performance on wet road surfaces can be improved effectively as compared to a case where only one end of the chamfered portion 13 is open to the main groove 9.

In the pneumatic tire described above, the sipe 12 is preferably disposed in a plurality of rows of ribs 10 among the ribs 10 formed in the tread portion 1. By providing the sipe 12 in the plurality of rows of ribs 10 in this manner, the steering stability performance on dry road surfaces and the steering stability performance on wet road surfaces can be improved in a compatible manner. In particular, the sipe 12 is preferably disposed in the rib 10 located on the tire center line CL in the tread portion 1 and/or other ribs 10 located on both sides of the rib 10. By disposing the sipe 12 in the rib 10 located closer to the central portion in the tire width direction than the rib 10 located on the outermost side (the shoulder portion) in the tire width direction, the effect obtained by the sipe 12 including the chamfered portion 13 is remarkable.

Additionally, at least a portion of the sipe 12 is preferably curved or bent in a plan view. The overall shape of the sipe 12 may be arcuate. Since the sipe 12 includes a curved or bent shape rather than a straight line in a plan view in this manner, the total amount of the edges 12A and 12B in the sipe 12 is increased, and the steering stability performance on wet road surfaces can be improved effectively. Note that, when at least a portion of the sipe 12 is curved or bent in a plan view, the inclination angle θ of the sipe 12 is an angle, with respect to the tire circumferential direction, of an imaginary line that connects both ends in the tire width direction of the sipe 12.

Figure 4A:
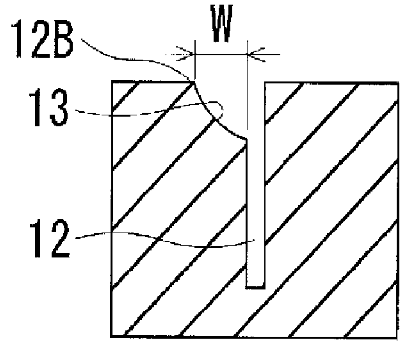
Figure 4B:
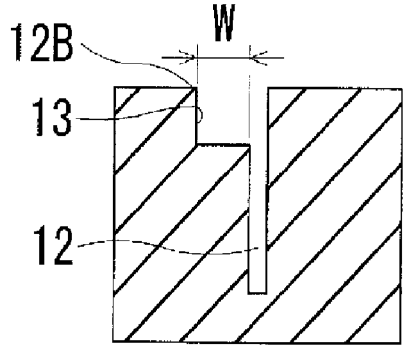
Figure 4C:
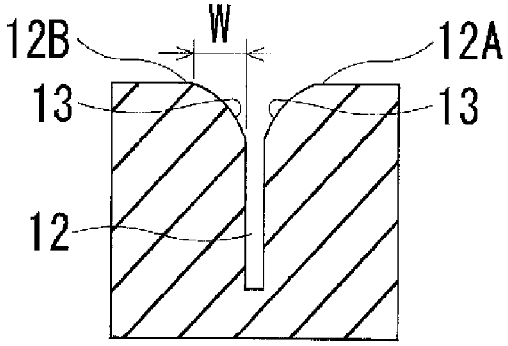
Figure 4D:
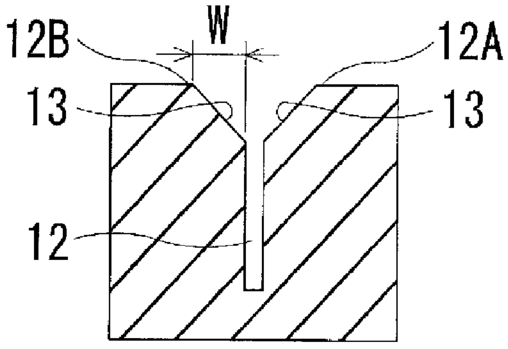

FIGS. 4A to 4D illustrate a cross-sectional shape of the sipe formed in the tread portion of the pneumatic tire according to the embodiment of the present technology. In FIG. 4A, when viewed in a cross-sectional view orthogonal to the extension direction of the sipe 12, the chamfered portion 13 is formed in one edge 12B of the sipe 12, and the cross-sectional shape of the chamfered portion 13 includes a contour line of a curved line that projects to the inner side in the tire radial direction. By forming such a cross-sectional shape, the groove volume can be sufficiently ensured with respect to deformation of the tread portion 1 when contacting the ground, and the drainage properties can be improved. Examples of another cross-sectional shape of the chamfered portion 13 of the sipe 12 include: a rectangular shape as illustrated in FIG. 4B, a shape having a curved contour line that projects to the outer side in the tire radial direction as illustrated in FIG. 4C, and a triangular shape as illustrated in FIG. 4D.

In the description described above, although an example in which the length in the tire width direction of the sipe 12 and the length of the chamfered portion 13 in the tire width direction are substantially identical has been illustrated (see FIG. 2), the lengths in the tire width direction may be different. Similarly, the lengths in the tire width direction of the sipe 14 and the chamfered portion 15 may be different.

Additionally, in the embodiment of FIG. 2, although an example in which the chamfered portion 15 of the sipe 14 terminates without reaching the maximum projection position P of the profile line L1 of the rib 10 has been illustrated, there is no limitation thereto, and the chamfered portion 15 of the sipe 14 may be disposed straddling the maximum projection position P of the profile line L1 of the ribs 10. Furthermore, in the embodiment of FIG. 2, although an example in which the width of the chamfered portion 13 is constant along the extension direction has been illustrated, the width of the chamfered portion 13 may not be constant from one end to the other end. If the width of the chamfered portion 13 is not constant from one end to the other end, the width of the chamfered portion 13 is preferably equal to or greater than the width of the end in the tire width direction of the chamfered portion 13 on the maximum projection position P of the profile line L1 of the rib 10. The arc forming the profile line L1 is preferably composed of a single arc or two arcs.

EXAMPLES

Tires of Conventional Example, Comparative Examples 1 and 2, and Examples 1 to 8 are manufactured, in which the pneumatic tire has a tire size of 245/40R19 and includes, in a tread portion, a plurality of main grooves extending in the tire circumferential direction, a plurality of rows of ribs defined by the main grooves, and a sipe extending in the tire width direction, the sipe includes: at least one end communicating with the main groove and a chamfered portion in at least one edge, the chamfered portion includes at least one end open to the main groove, and the following are set as illustrated in Table 1: the position of the chamfered portion, a magnitude relationship between the radius of curvature TR and the radius of curvature RR, the product of the maximum projection amount D and the maximum width W, the arrangement position of the chamfered portion (both sides or one side), the inclination angle θ of the sipe with respect to the tire circumferential direction, the presence/absence of termination in the rib of one end of the sipe, the number of rows of ribs including sipes, the overall shape of the sipe (straight line or curved), and the presence/absence of an opening, to the main groove, at both ends of the chamfered portion.

Note that, in Table 1, when the position of a chamfered portion is "not straddle", it means that the chamfered portion is disposed and spaced apart in the tire width direction from the maximum projection position of the profile line of the rib, whereas when the position of a chamfered portion is "straddle", it means that the chamfered portion is present on both sides in the tire width direction with respect to the maximum projection position of the profile line of the rib. In the tires of Conventional Example, Comparative Examples 1 and 2, and Examples 1 to 8, the profile line defining the road contact surface of the rib with the sipe projects further to the outer side in the tire radial direction than the reference tread profile line, and the maximum projection position of the profile line of the rib is located at the central portion in the tire width direction of the rib.

A sensory evaluation regarding the steering stability performance on dry road surfaces and the steering stability performance on wet road surfaces is performed with respect to these test tires by a test driver, and the results are illustrated in Table 1.

The sensory evaluation for the steering stability performance on dry road surfaces and the steering stability performance on wet road surfaces is performed with the test tires on a wheel with a rim size of 19×8.5 J mounted on a vehicle and inflated to an air pressure of 260 kPa. Evaluation results are expressed as index values with the value of the Conventional Example being defined as 100. Larger index values indicate superior steering stability performance on dry road surfaces and superior steering stability performance on wet road surfaces.

TABLE 1

| | Conventional Example | Comparative Example 1 | Comparative Example 2 |
|---|---|---|---|
| Position of chamfered portion | Not straddle | Straddle | Straddle |
| Magnitude relationship between radius of curvature TR and radius of curvature RR | TR > RR | TR > RR | TR > RR |
| Product of maximum projection amount D and maximum width W ($mm^2$) | 0.90 | 0.05 | 1.50 |
| Arrangement position of chamfered portion (both sides or one side) | Both sides | Both sides | Both sides |
| Inclination angle θ of sipe with respect to tire circumferential direction | 90° | 90° | 90° |
| Presence/absence of termination in rib of one end of sipe | No | No | No |
| Number of rows of ribs including sipes | 1 row | 1 row | 1 row |
| Overall shape of sipe (straight line or curved) | Straight lines | Straight lines | Straight lines |
| Presence/absence of opening, to main groove, at both ends of chamfered portion | No | No | No |
| Steering stability performance on dry road surfaces | 100 | 100 | 97 |
| Steering stability performance on wet road surfaces | 100 | 99 | 100 |

| | Example 1 | Example 2 | Example 3 | Example 4 |
|---|---|---|---|---|
| Position of chamfered portion | Straddle | Straddle | Straddle | Straddle |
| Magnitude relationship between radius of curvature TR and radius of curvature RR | TR > RR | TR > RR | TR > RR | TR > RR |
| Product of maximum projection amount D and maximum width W ($mm^2$) | 0.90 | 0.90 | 0.90 | 0.90 |
| Arrangement position of chamfered portion (both sides or one side) | Both sides | One side | One side | One side |
| Inclination angle θ of sipe with respect to tire circumferential direction | 90° | 90° | 85° | 65° |
| Presence/absence of termination in rib of one end of sipe | No | No | No | No |
| Number of rows of ribs including sipes | 1 row | 1 row | 1 row | 1 row |
| Overall shape of sipe (straight line or curved) | Straight lines | Straight lines | Straight lines | Straight lines |
| Presence/absence of opening, to main groove, at both ends of chamfered portion | No | No | No | No |
| Steering stability performance on dry road surfaces | 100 | 100 | 100 | 100 |
| Steering stability performance on wet road surfaces | 105 | 107 | 108 | 110 |

| | Example 5 | Example 6 | Example 7 | Example 8 |
|---|---|---|---|---|
| Position of chamfered portion | Straddle | Straddle | Straddle | Straddle |
| Magnitude relationship between radius of curvature TR and radius of curvature RR | TR > RR | TR > RR | TR > RR | TR > RR |
| Product of maximum projection amount D and maximum width W ($mm^2$) | 0.90 | 0.90 | 0.90 | 0.90 |

TABLE 1-continued

| | | | | |
|---|---|---|---|---|
| Arrangement position of chamfered portion (both sides or one side) | One side | One side | One side | One side |
| Inclination angle θ of sipe with respect to tire circumferential direction | 65° | 65° | 65° | 65° |
| Presence/absence of termination in rib of one end of sipe | Yes | Yes | Yes | Yes |
| Number of rows of ribs including sipes | 1 row | 3 rows | 3 rows | 3 rows |
| Overall shape of sipe (straight line or curved) | Straight lines | Straight lines | Curved | Curved |
| Presence/absence of opening, to main groove, at both ends of chamfered portion | No | No | No | Yes |
| Steering stability performance on dry road surfaces | 105 | 108 | 108 | 108 |
| Steering stability performance on wet road surfaces | 110 | 113 | 115 | 116 |

As can be seen from Table 1, by devising the shape of the chamfered portions formed on the sipes, the tires of Examples 1 to 8 have improved the steering stability performance on dry road surfaces and the steering stability performance on wet road surfaces in a compatible manner.

On the other hand, in the tire of Comparative Example 1, since the product of the maximum projection amount D and the maximum width W is set to be lower than the range stipulated in the present technology, the effect of improving the steering stability performance on wet road surfaces is not sufficiently obtained. In the tire of Comparative Example 2, since the product of the maximum projection amount D and the maximum width W is set to be higher than the range stipulated in the present technology, the effect of improving the steering stability performance on dry road surfaces is not sufficiently obtained.

The invention claimed is:

1. A pneumatic tire, comprising:

in a tread portion, a plurality of main grooves extending in a tire circumferential direction;

a plurality of rows of ribs defined by the plurality of main grooves; and a sipe extending in a tire width direction in a rib among the plurality of rows of ribs, the sipe comprising at least one end communicating with at least one of the main grooves and a chamfered portion in at least one edge, the chamfered portion comprising only one end open to the at least one of the main grooves, the chamfered portion on adjacent ones of the sipe in the tire circumferential direction alternatingly opening to opposing main grooves defining the rib, adjacent ones of the sipe in the tire circumferential direction opening to a same one of the main grooves alternating including and not including the chamfer at the opening to the same one of the main grooves, a cross-sectional shape of the chamfered portion includes a contour line of a curved line that projects to an inner side in a tire radial direction, a profile line defining a road contact surface of the rib comprising the sipe projecting further to an outer side in the tire radial direction than a reference tread profile line in a meridian cross-sectional view, a radius of curvature TR (mm) of an arc forming the reference tread profile line and a radius of curvature RR (mm) of an arc forming the profile line of the rib satisfying a relationship of TR>RR, the chamfered portion being disposed straddling a maximum projection position of the profile line of the rib without extending across an entire width of a ground contact surface of the rib, a maximum projection amount D (mm) of the rib with respect to the reference tread profile line and a maximum width W (mm) of the chamfered portion satisfying a relationship of $0.05\ mm^2 < W \times D < 1.50\ mm^2$, and at least two adjacent rows of ribs of the plurality of rows of ribs have a same maximum projection amount D with respect to the reference tread profile line, the at least two adjacent rows of ribs being provided without another rib disposed therebetween and one rib of the at least two adjacent rows of ribs being a center rib located on a center line of the tire in the tire width direction.

2. The pneumatic tire according to claim 1, wherein the chamfered portion is disposed in only one edge of the sipe.

3. The pneumatic tire according to claim 2, wherein the sipe is inclined with respect to the tire circumferential direction.

4. The pneumatic tire according to claim 3, wherein an inclination angle θ on an acute angle side of the sipe with respect to the tire circumferential direction is from 40° to 80°.

5. The pneumatic tire according to claim 4, wherein only one end of the sipe terminates in the rib.

6. The pneumatic tire according to claim 5, wherein the sipe is disposed in the plurality of rows of ribs.

7. The pneumatic tire according to claim 6, wherein at least a portion of the sipe is curved or bent in a plan view.

8. The pneumatic tire according to claim 7, wherein each end of the chamfered portion is open to the one of the main grooves.

9. The pneumatic tire according to claim 1, wherein the sipe is inclined with respect to the tire circumferential direction.

10. The pneumatic tire according to claim 1, wherein an inclination angle θ on an acute angle side of the sipe with respect to the tire circumferential direction is from 40° to 80°.

11. The pneumatic tire according to claim 1, wherein only one end of the sipe terminates in the rib.

12. The pneumatic tire according to claim 1, wherein the sipe is disposed in the plurality of rows of ribs.

13. The pneumatic tire according to claim 1, wherein at least a portion of the sipe is curved or bent in a plan view.

14. The pneumatic tire according to claim 1, wherein each end of the chamfered portion is open to the one of the main grooves.

* * * * *